United States Patent
Gehman et al.

(10) Patent No.: US 7,278,308 B2
(45) Date of Patent: Oct. 9, 2007

(54) THERMAL ISOLATION BETWEEN HEATING AND SENSING FOR FLOW SENSORS

(75) Inventors: Richard W. Gehman, Freeport, IL (US); Michael G. Marchini, Freeport, IL (US); Martin G. Murray, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/299,118

(22) Filed: Dec. 8, 2005

(65) Prior Publication Data

US 2007/0137297 A1   Jun. 21, 2007

(51) Int. Cl.
  *G01F 1/68* (2006.01)
(52) U.S. Cl. .................................................. 73/204.26
(58) Field of Classification Search ..................... None
  See application file for complete search history.

(56) References Cited

U.S. PATENT DOCUMENTS

| | | | |
|---|---|---|---|
| 4,333,354 A | 6/1982 | Feller | 73/861.77 |
| 4,358,947 A | 11/1982 | Greene et al. | 73/3 |
| 4,548,078 A | 10/1985 | Bohrer et al. | 73/204 |
| 4,680,963 A | 7/1987 | Osamu | |
| 4,841,170 A * | 6/1989 | Eccleston | 327/513 |
| 5,050,429 A | 9/1991 | Nishimoto et al. | 73/204.26 |
| 5,351,536 A * | 10/1994 | Uchiyama | 73/204.26 |
| 6,548,895 B1 * | 4/2003 | Benavides et al. | 257/712 |
| 6,553,808 B2 | 4/2003 | Bonne et al. | 73/24.01 |
| 6,553,829 B1 * | 4/2003 | Nakada et al. | 73/204.26 |
| 6,668,230 B2 * | 12/2003 | Mansky et al. | 702/30 |
| 6,684,695 B1 * | 2/2004 | Fralick et al. | 73/204.26 |
| 6,715,339 B2 | 4/2004 | Bonne et al. | 73/24.01 |
| 6,826,966 B1 | 12/2004 | Karbassi et al. | 73/861.52 |
| 6,851,311 B2 * | 2/2005 | Nakada et al. | 73/204.26 |

(Continued)

FOREIGN PATENT DOCUMENTS

EP   1092962 A2   4/2001

(Continued)

OTHER PUBLICATIONS

*Digital CMOS Sensor Chips for Media-Isolated Liquid Flow Sensing*, U. Kanne, Sensirion AG, Zurich, Switzerland, May 2003.

*Primary Examiner*—Harshad Patel
(74) *Attorney, Agent, or Firm*—Kermit D. Lopez; Luis M. Ortiz

(57) ABSTRACT

A flow sensor system includes a plurality of flow sensor chips, wherein each flow sensor chip among the plurality of flow sensor chips comprises a substrate, a heater element, a heater control circuit, and flow sensor component formed on the substrate, wherein the heater element is disposed separately from the heater control circuit on the substrate, wherein the heater control circuit is thermally isolated from the heater element and the flow sensor component. Additionally, an air gap can be formed between each sensor chip among the plurality of flow sensor chips, wherein the plurality of flow sensor chips comprises a flow sensor system in which each of the flow sensor chips are separated from one another by the air gap formed therebetween in order to reduce output distortion, response time, warm-up time, drift and noise associated with the plurality of flow sensor chips.

19 Claims, 1 Drawing Sheet

U.S. PATENT DOCUMENTS

| | | | |
|---|---|---|---|
| 6,871,537 B1 | 3/2005 | Gehman et al. | 73/204.26 |
| 6,925,866 B2 * | 8/2005 | Watanabe et al. | 73/204.26 |
| 7,122,156 B2 * | 10/2006 | Bergh et al. | 422/102 |
| 2002/0073772 A1 | 6/2002 | Bonne et al. | 73/204.11 |
| 2005/0240110 A1 | 10/2005 | Liu et al. | 600/505 |

FOREIGN PATENT DOCUMENTS

| | | |
|---|---|---|
| WO | WO 02/18884 A2 | 3/2002 |

* cited by examiner

THERMAL ISOLATION BETWEEN HEATING AND SENSING FOR FLOW SENSORS

TECHNICAL FIELD

Embodiments are generally related to sensing devices and methods. Embodiments are also related to flow sensors and ambient temperature sensors. Embodiments are also related to systems and methods for configuring flow sensor integrated circuit (IC) chips.

BACKGROUND OF THE INVENTION

Sensors have been used to measure flow rates in various medical, process, and industrial applications, ranging from portable ventilators supplying anesthetizing agents to large-scale processing plants in a chemical plant. In these applications, flow control is an inherent aspect of proper operation, which is achieved in part by using flow sensors to measure the flow rate of a fluid within the flow system. In many flow systems, e.g., fuel cell flow systems containing a binary mixture of methanol and water, the chemical composition of the fluid may change frequently.

A flow system is often required to flow more than one fluid having different chemical and thermo physical properties. For example, in a semiconductor processing system that passes a nitrogen-based gas, the nitrogen-based gas may at times be replaced by a hydrogen-based or helium-based gas, depending on the needs of the process; or in a natural gas metering system, the composition of the natural gas may change due to non-uniform concentration profiles of the gas.

Fluid flow sensors are thus important in a variety of applications. It is often necessary to determine the composition of a fluid utilizing a liquid or fluid flow sensor. One method for determining the composition of the fluid is to measure its thermal conductivity and compare the resulting value to a standard value. Measurements can be obtained by measuring power transferred from a heater to the fluid. In many cases, the fluid should not come into contact with the sensor and/or associated heater due to material incompatibility, explosion proof applications, or even medical hazards. A compatible material should therefore be placed between the fluid and the sensor and/or heater. Such material, however, typically dissipates power away from the fluid and the sensor, thereby reducing the thermal efficiency and therefore the signal quality. What is needed, therefore, is an enhanced sensor configuration that can overcome the aforementioned drawbacks.

One example of a flow sensor is disclosed in U.S. Pat. No. 6,871,537, entitled "Liquid Flow Sensor Thermal Interface Methods and Systems," which issued to Richard Gehman, et al. on Mar. 29, 2005. U.S. Pat. No. 6,871,537, which is assigned to Honeywell International Inc. and is incorporated by reference herein, generally describes a sensor method and system in which a fluid flow sensor is provided that measures the thermal conductivity of a fluid. The sensor is configured to include one or more sensing elements associated with a sensor substrate.

As described in U.S. Pat. No. 6,871,537, a heater is associated with the sensor and provides heat to the fluid. A film component can also be provided that isolates the fluid from the heater and the sensor, such that the film component conducts heat in a direction from the heater to the sensor, thereby forming a thermal coupling between the sensor, the heater and the fluid, which permits the sensor to determine a composition of said fluid by measuring thermal conductivity thereof without undesired losses of heat in other directions. The film component is generally configured on or in the shape of a tubing or a flow channel.

Airflow sensing chips have been utilized in a number of sensing applications, and can include the use of a physical bridge, approximately 1 micrometer thick, that thermally isolates sense resistors, ambient temperature sensors and heater resistors from each other, which can form a part of the airflow sensing chip configuration. Such devices function very well in air flow applications. The use of such a thin bridge, however, is inherently fragile and if exposed to liquid flow results in damage to the bridge, in effect a "wash out," which effectively destroys the sensing capability of the airflow sensing chip.

In order to sense liquid flow, chips of this type can be "ruggedized" by eliminating the physical bridge. In such a situation, however, a different substrate is required because standard silicon has a very high thermal conductivity and the resistors associated with the sensor chip tend to operate toward the same temperature, which prevents proper sensing functions. Substrates other than silicon may be utilized, which provide low thermal conductivity and are compatible with wafer processing. One such substrate material is optoelectronic grade quartz, assuming that that Pt resistors are being utilized in association with the sensor chip. An alternate approach which has been successfully demonstrated involves the use of Nickel Iron alloys on a substrate of Pyrex glass. Pyrex has a much lower thermal conductivity than quartz and provides double the sensor output and lower errors. Nickel-iron may also be utilized, but tends to corrode easily. Processing Pt on Pyrex generally does not work well, because the Pyrex melts at the Pt anneal temperature.

Constructing a liquid flow sensor on solid quartz is possible, but its production has been limited. Compared to other airflow sensors, however, the resulting product has low sensitivity, far higher drift, very large temperature errors, excessive power dissipation, and a very long warm-up time. Most of these problems are due to the thermal cross talk (inside the quartz) between those resistors which, on an airflow sensor, are thermally isolated (by air gaps). It is believed that it may be possible to recover from some of those errors by physically separating the cross-talking resistors.

Thermal flow sensors typically require controlled heat sinking to direct heat flows between the media and the heating and sensing functions. It is often necessary, however, to minimize heat that flows in other directions, which lowers thermal efficiency, distorts output signals, increases response time and warm-up time, causes output drift/noise and requires excessive power to operate. It is believed that a solution to these problems involves the design and implementation of an improved flow sensor system, which is described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved flow sensor system.

It another aspect of the present invention to provide for an improved flow sensor system in which thermal isolation is provided between heating and sensing components associated with the flow sensor system.

The aforementioned aspects and other objectives and advantages can now be achieved as described herein. A flow sensor system is disclosed, which includes a plurality of flow sensor chips, wherein each flow sensor chip among the plurality of flow sensor chips comprises a substrate, a heater element, a heater control circuit, and flow sensor component formed on the substrate, wherein the heater element is disposed separately from the heater control circuit on the substrate, wherein the heater control circuit is thermally isolated from the heater element and the flow sensor component. Additionally, an air gap can be formed between each sensor chip among the plurality of flow sensor chips, wherein the plurality of flow sensor chips comprises a flow sensor system in which each of the flow sensor chips are separated from one another by the air gap formed therebetween in order to reduce output distortion, response time, warm-up time, drift and noise associated with the plurality of flow sensor chips.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
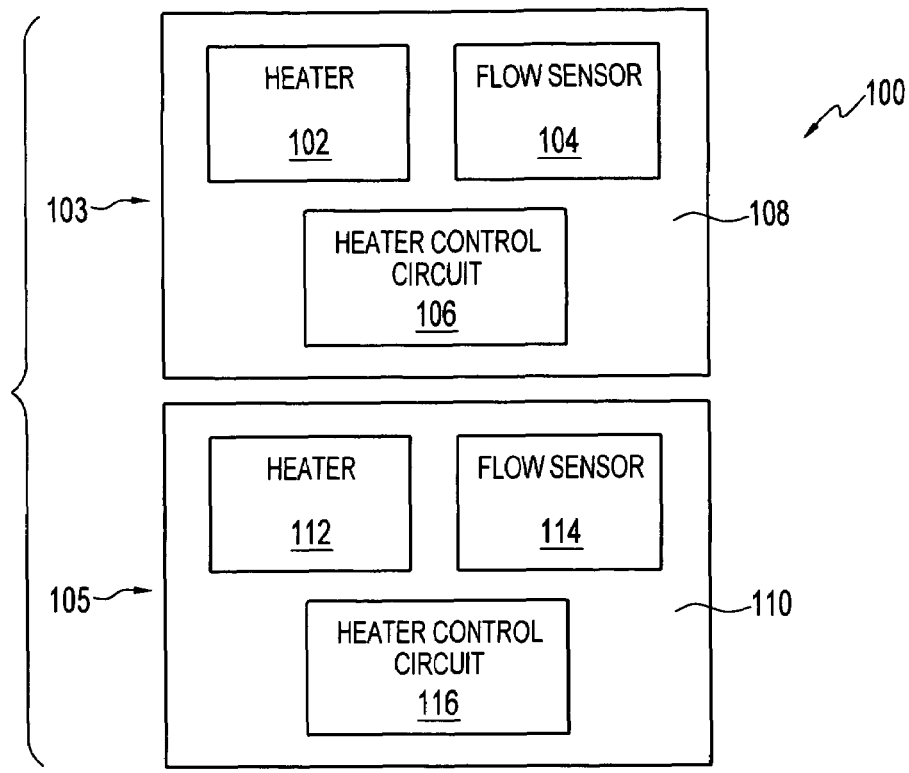
FIG. 1 illustrates a flow sensor system comprising a plurality of sensor chips, in accordance with a preferred embodiment.
Figure 2:
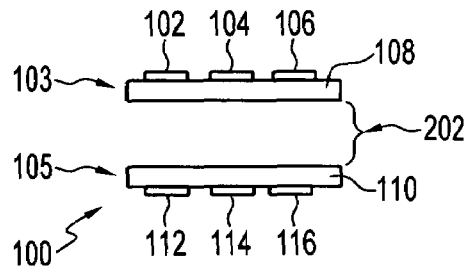
FIG. 2 illustrates a side view of the flow sensor system depicted in FIG. 1 in accordance with a preferred embodiment.

FIG. 1 illustrates a flow sensor system 100 comprising a plurality of sensor chips 103, 105, in accordance with a preferred embodiment. FIG. 2 illustrates a side view of the flow sensor system 100 depicted in FIG. 1 in accordance with a preferred embodiment. The flow sensor system 100 generally includes a plurality of flow sensor chips 103, 105, wherein each flow sensor chip 103, 105 respectively comprises a substrate 108, 110, a heater element 102, 112, a heater control circuit 106, 116, and a flow sensor component 104, 114 formed on the substrates 108, 110, wherein the heater elements 102, 112 are disposed separately from the heater control circuits 106, 116 on the substrates 108, 110. Each heater control circuit 106, 116 can be respectively thermally isolated from the heater element 102, 112 and the flow sensor components 104, 114.

As indicated in the side view depicted in FIG. 2, an air gap 202 can be formed between each sensor chip 103, 105. The flow sensor chips 103, 105 comprise a flow sensor system 100 in which each of the flow sensor chips 103, 105 are separated from one another by the air gap 202 formed therebetween in order to reduce output distortion, response time, warm-up time, drift and noise associated with the plurality of flow sensor chips. Note that each of the substrate 108, 110 can be formed from a material such as, for example, a fiber glass substrate, or thin (e.g., approximately 1 to 5 mm or 25 to 250 micrometers) flexible circuitry, such as, for example, flex circuitry based on a polyimide, depending of course on design considerations. Substrates 108, 110 can also be formed from a ceramic substrate.

System 100 is thus composed of two more sensor chips 103, 105. In sensor chip 103, the heater element 102 is thermally divided from the heater control circuitry 106, which can function as, for example, a fluid temperature circuit. Similarly, in sensor chip 105, the heater element 112 can also be thermally divided from the heater control circuitry 116, which can also function as a fluid temperature circuit, depending upon design considerations. The two chips 103, 105 are physically separated by the air gap 202 so that the heater control circuitry 106, 116 respectively does not thermally communicate with the heater elements 102, 112 or the flow sensor components 104, 114. Such a configuration thus serves to greatly reduce output distortion, response time, warm-up time, drift and noise.

Figure 3:
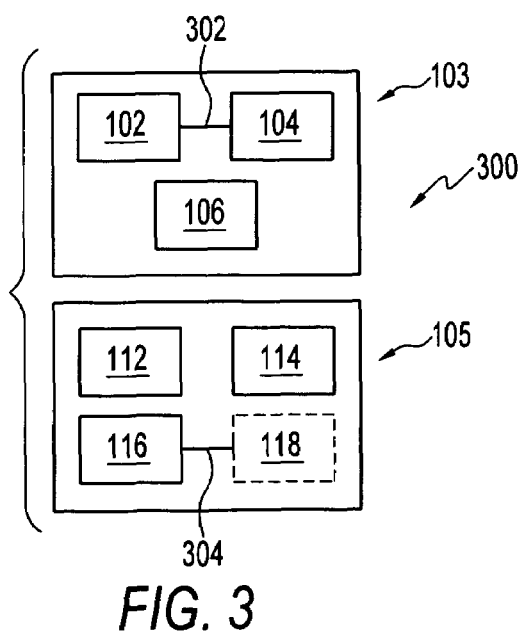
FIG. 3 illustrates a side view of a flow sensor system, which can be implemented in accordance with an alternative embodiment.

FIG. 3 illustrates a side view of a flow sensor system 300, which can be implemented in accordance with an alternative embodiment. Note that in FIGS. 1-3, identical or similar parts or components are generally indicated by identical reference numerals. System 300 includes flow sensor chips 103, 105, such that each flow sensor chip 103, 105 respectively comprises a substrate 108, 110, a heater element 102, 112, a heater control circuit 106, 116, and a flow sensor component 104, 114 formed on the substrates 108, 110. The heater elements 102, 112 are disposed separately from the heater control circuits 106, 116 on the substrates 108, 110. Each heater control circuit 106, 116 can be respectively thermally isolated from the heater element 102,112 and the flow sensor components 104,114.

In the configuration of system 300, two identical chips 103, 105 are provided. Chips 103, 105 are configured such that the heating, sensing and controlling functions are located on each chip as described above. The chips 103, 105 are mounted separate from one another. Chip 103 is configured so that only the respective heating and sensing functions 102, 104 are interconnected as indicated by a connecting line 302. Chip 105 is configured so that only the control circuitry 116 and a temperature sensor 118 (e.g., an ambient temperature sensor) are interconnected as indicated by connecting line 304. Note that temperature sensor 118 can be provided as a fluid temperature sensor or an ambient temperature sensor, depending upon design considerations.

Assuming that the temperature sensor 118 functions as an ambient temperature sensor, the configuration depicted in FIG. 3 can be based on one which the ambient temperature sensor 118 is located exclusively on the second chip 105. Prior art configurations are based on a one-chip approach, in which the ambient temperature sensor "talks" to the heater component and is located so that it is approximately 10 degrees "too hot," which takes a number of critical minutes to stabilize its temperature. Such a prior art configuration also distorts the output over temperature.

Placing the ambient temperature sensor 118 on the second chip 105, however, recovers the original temperature compensation and much of the speed of an airflow sensor. Of course, such a configuration may cost more and takes up additional space. A secondary advantage of such a configuration, however, is that, except for the heater resistor, all of the heater control circuitry can be located remote from the heater, reducing the temperature of the other components and reducing their errors (which are much smaller than the errors being corrected by the remote ambient temperature sensor).

For other multiple chip approaches, the figures illustrated herein demonstrate workable configurations separating the heater and the sense resistors. The best (for maximum output) is actually a three chip approach, with a heater located in the middle chip and with one flow sensor upstream and one flow sensor downstream. The ambient temperate sensor can then be co-located with either flow sensor, upstream preferred.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A flow sensor system, comprising:
   a plurality of flow sensor chips, wherein each flow sensor chip among said plurality of flow sensor chips comprises a substrate, a heater element, a heater control circuit, and flow sensor component formed on said substrate, wherein said heater element is disposed separately from said heater control circuit on said substrate, wherein said heater control circuit is thermally isolated from said heater element and said flow sensor component, wherein said substrate comprises thin flexible circuitry; and
   an air gap formed between each sensor chip among said plurality of flow sensor chips, wherein said plurality of flow sensor chips comprises a flow sensor system in which each of said flow sensor chips are separated from one another by said air gap formed therebetween in order to reduce output distortion, response time, warm-up time, drift and noise associated with said plurality of flow sensor chips.

2. The system of claim 1 wherein said plurality of flow sensor chips comprises a first flow sensor chip and a second flow sensor chip.

3. The system of claim 2 wherein said first flow sensor chip is configured such that said heater element associated with said first flow sensor chip is interconnected with said flow sensor component associated with said first flow sensor chip.

4. The system of claim 2 wherein said second flow sensor chip is configured such that said heater control circuit associated with said second flow sensor chip is interconnected with a temperature sensor associated with said second flow sensor chip.

5. The system of claim 1 wherein said substrate comprises fiber glass.

6. The system of claim 1 wherein said substrate comprises ceramic.

7. The system of claim 1 wherein said substrate comprises quartz.

8. The system of claim 1 further comprising an ambient temperature sensor located on only one flow sensor chip among said plurality of flow sensor chips.

9. A flow sensor system, comprising:
   a plurality of flow sensor chips, wherein each flow sensor chip among said plurality of flow sensor chips comprises a substrate, a heater element, a heater control circuit, and flow sensor component formed on said substrate, wherein said heater element is disposed separately from said heater control circuit on said substrate, wherein said heater control circuit is thermally isolated from said heater element and said flow sensor component;
   an ambient temperature sensor located on only one flow sensor chip among said plurality of flow sensor chips and
   an air gap formed between each sensor chip among said plurality of flow sensor chips, wherein said plurality of flow sensor chips comprises a flow sensor system in which each of said flow sensor chips are separated from one another by said air gap formed therebetween in order to reduce output distortion, response time, warm-up time, drift and noise associated with said plurality of flow sensor chips.

10. The system of claim 9 wherein said substrate comprises at least one of the following types of substrate material: fiber glass, ceramic, or quartz.

11. The system of claim 10 wherein said substrate comprises thin flexible circuitry.

12. A flow sensor method, comprising:
    providing a plurality of flow sensor chips, wherein each flow sensor chip among said plurality of flow sensor chips comprises a substrate, a heater element, a heater control circuit, and flow sensor component formed on said substrate, wherein said heater element is disposed separately from said heater control circuit on said substrate, wherein said heater control circuit is thermally isolated from said heater element and said flow sensor component; and
    forming an air gap between each sensor chip among said plurality of flow sensor chips, wherein said plurality of flow sensor chips comprises a flow sensor system in which each of said flow sensor chips are separated from one another by said air gap formed therebetween in order to reduce output distortion, response time, warm-up time, drift and noise associated with said plurality of flow sensor chips.

13. The method of claim 12 configuring said plurality of flow sensor chips comprises a first flow sensor chip and a second flow sensor chip.

14. The method of claim 13 further comprising:
    configuring said first flow sensor chip such that said heater element associated with said first flow sensor chip is interconnected with said flow sensor component associated with said first flow sensor chip.

15. The method of claim 13 further comprising:
    configuring said second flow senor chip such that said heater control circuit associated with said second flow sensor chip is interconnected with a temperature sensor associated with said second flow sensor chip.

16. The method of claim 12 further comprising configuring said substrate from fiber glass.

17. The method of claim 12 further comprising configuring said substrate from ceramic.

18. The method of claim 12 further comprising configuring said substrate from quartz.

19. The method of claim 12 further comprising locating an ambient temperature sensor on only one flow sensor chip among said plurality of flow sensor chips.

* * * * *